United States Patent
Cho et al.

(10) Patent No.: US 6,511,747 B1
(45) Date of Patent: Jan. 28, 2003

(54) HIGH STRENGTH POLYETHYLENE NAPHTHALATE FIBER

(75) Inventors: Eun-Lai Cho, Seoul (KR); Song-Joo Choi, Ulsan (KR); Jong Lee, Seoul (KR)

(73) Assignee: Hyosung Corporation, Seoul (KR)

( * ) Notice: Subject to any disclaimer, the term of this patent is extended or adjusted under 35 U.S.C. 154(b) by 0 days.

(21) Appl. No.: 09/972,002

(22) Filed: Oct. 4, 2001

(30) Foreign Application Priority Data

May 10, 2001 (KR) ......................... 2001-25459

(51) Int. Cl.$^7$ ............... D01F 6/00; D01F 6/62
(52) U.S. Cl. ............ 428/364; 428/395; 152/451
(58) Field of Search .................. 428/364, 395; 152/451; 57/237

(56) References Cited

U.S. PATENT DOCUMENTS

| | | | | |
|---|---|---|---|---|
| 4,101,525 A | * | 7/1978 | Davis et al. | 528/309 |
| 5,397,527 A | * | 3/1995 | Rim et al. | 264/210.8 |
| 5,637,385 A | * | 6/1997 | Mizuki et al. | 442/361 |
| 5,750,644 A | * | 5/1998 | Duh | 528/481 |
| 5,955,196 A | * | 9/1999 | Sakellerides | 428/395 |
| 6,351,933 B1 | * | 3/2002 | Reuter | 57/237 |

* cited by examiner

*Primary Examiner*—Newton Edwards
(74) *Attorney, Agent, or Firm*—Pennie & Edmonds LLP

(57) ABSTRACT

Described in the present invention is a high strength polyethylene naphthalate fiber which provides a treated cord having high tenacity and improved dimensional stability that can be advantageously employed as a fibrous reinforcement material of rubber products such as tires and belts.

5 Claims, 2 Drawing Sheets

HIGH STRENGTH POLYETHYLENE NAPHTHALATE FIBER

FIELD OF THE INVENTION

The present invention relates to a high strength polyethylene naphthalate fiber useful for the reinforcement of rubber products such as tires.

BACKGROUND OF THE INVENTION

A polyethylene-2,6-naphthalate has a higher glass transition temperature, crystallization temperature, melting temperature and melting viscosity, as compared to a comparable polyethylene terephthalate, and thus, it is generally spun at a temperature higher than the spinning temperature (310 to 320° C.) of a conventional polyethylene terephthalate. However, at a high spinning temperature, heat decomposition takes place to some extent, resulting in a reduction of the intrinsic viscosity, which makes it difficult to prepare a polyethylene-2,6-naphthalate yarn having the original high strength (see Japanese Patent Publication Nos. 72-35318, 73-64222 and 75-16739).

Japanese Patent No. 2945130 describes a method of making polyethylene naphthalate fibers having high tenacity and high modulus by way of controlling the spinning speed and spinning draft ratio and changing the drawing temperature stepwise, instead of raising the spinning temperature. According to this method, however, uniform spinning cannot be accomplished and the drawing process itself is difficult to control because of a high first-step drawing temperature of more than 150° C.

The present inventors have endeavored to develop an improved polyethylene-2,6-naphthalate fiber and have discovered that a high strength fiber can be prepared by way of controlling the properties of polyethylene-2,6-naphthalate polymer itself and the drawing conditions while maintaining a relatively low spinning temperature.

SUMMARY OF THE INVENTION

It is, therefore, an object of the present invention to provide a high strength polyethylene naphthalate fiber having high tenacity and improved dimensional stability, suitable for use as a reinforcing cord.

In accordance with one aspect of the present invention, there is provided a polyethylene naphthalate fiber prepared by a method comprising the steps of:

(A) melt-spinning a solid-phase polymerized polyethylene-2,6-naphthalate chip, composed of 95 mol % or more of ethylene-2,6-naphthalate units as the recurring unit, and having a manganese content of 30 to 70 ppm, an antimony content of 180 to 300 ppm and an intrinsic viscosity of 0.90 to 1.00, through a spinneret at a spinning draft ratio ranging from 400 to 900 to form a molten spun yarn, (B) rapid-cooling and solidifying the spun yarn by passing it through a solidification zone, (C) withdrawing the solidified yarn at such a rate that an undrawn yarn having a birefringence of 0.005 to 0.025 is formed, and (D) subjecting the undrawn yarn to a multi-stage-drawing process to a total draw ratio of 6.5 or more to obtain a fiber, wherein the temperature of the second drawing stage is maintained in the range of 150 to 180° C.; said fiber having (1) an intrinsic viscosity of 0.70 to 0.77, (2) a tenacity of at least 9.5 g/d, (3) an elongation of at least 9.5%, (4) a birefringence of at least 0.45, (5) a density of 1.355 to 1.368, (6) a melting point of 270 to 275° C., and (7) a shrinkage of 2 to 3%.

BRIEF DESCRIPTION OF THE DRAWINGS

The above and other objects and features of the present invention will become apparent from the following description of the invention, when taken in conjunction with the accompanying drawings, in which.

| | |
|---|---|
| 1: pack | 2: nozzles |
| 3: cooling zone | 4: spun yarns |
| L: hood length | 5: oil-feeding roller |
| 6: withdrawing roller | 7, 8, 9 and 10: drawing rollers |
| 11: final drawn yams (original yarns) | |
| 12: pack body | 13: upper dispersing plate |
| 14a, 14b: polymer transporting pipe | |
| 15: lower dispersing plate | 16: filtrate layer |

DETAILED DESCRIPTION OF THE INVENTION

The polyethylene naphthalate chip which is employed in the present invention contains at least 95 mol % of ethylene-2,6-naphthalate units as the recurring unit. In a preferred embodiment, the polyethylene naphthalate chip is composed essentially of polyethylene-2,6-naphthalate.

The inventive polyethylene naphthalate chip may be prepared from a raw chip having a low intrinsic viscosity (IV) of 0.42 to 0.50 by solid-phase polymerization, and it has an IV of 0.90 to 1.00 and a moisture content of 30 ppm or below. The raw chip is prepared by melt-mixing naphthalene-2,6-dimethylcarboxylate (NDC) and ethylene glycol in a weight ratio of 2.0 to 2.3 at a temperature of 190° C., conducting an ester-exchange reaction by heating the molten mixture at a temperature of 220 to 230° C. for 2 to 3 hrs, and then subjecting the resulting mixture to condensation and polymerization at a temperature of 280 to 290° C. for 2 to 3 hrs.

In the ester-exchange reaction, a manganese compound, e.g., manganese acetate, may be added as an ester-exchange catalyst in such an amount that the residual maganese remaining in the polymer is in the range of 30 to 70 ppm. When the amount of the catalyst used corresponds to a residual manganese content of less than 30 ppm, the reaction rate becomes too slow, while if the value is more than 70 ppm, the excessive amount of the catalyst induces undesirable effects during spinning.

In the condensation and polymerization step, an antimony compound, e.g., antimony trioxide, may be added as a polymerization catalyst in such an amount that the residual antimony remaining in the polymer is in the range of 180 to 300 ppm. When the amount of the catalyst used corresponds to a residual antimony content of less than 180 ppm, an accelerated polymerization reaction cannot be achieved, while if the value is more than 300 ppm, the excessive amount of the catalyst induces undesirable problems during spinning and drawing.

In addition, a phosphorus-based heat-resistant stabilizer, e.g., trimethyl phosphate, may be added in such an amount that the residual phosphorus remaining in the polymer is in the range of 35 to 45 ppm, and that the manganese/phosphorus weight ratio is less than 2.0. In case the manganese/phosphorus weight ratio is 2.0 or higher, excessive oxidation occurs during solid-phase polymerization, giving a spun yarn having poor properties.

Figure 1:
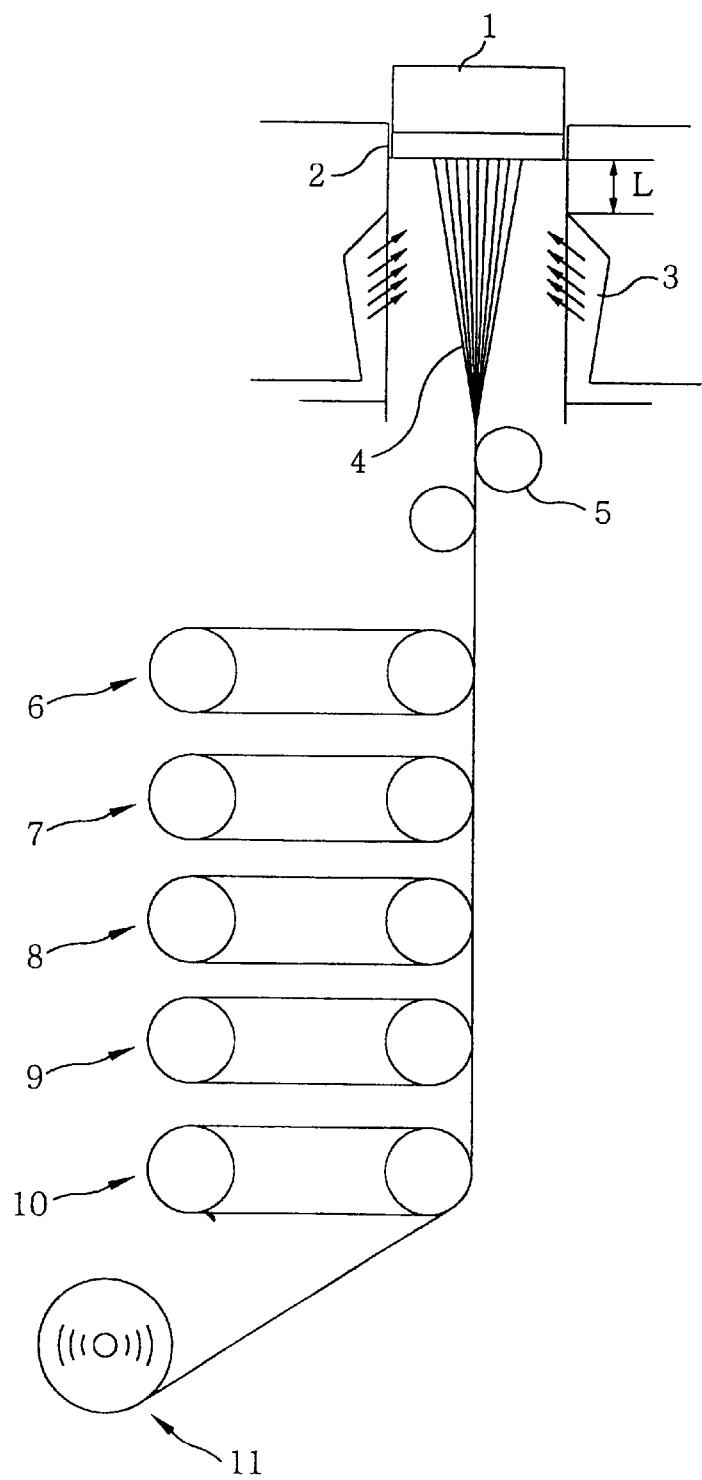
FIG. 1 shows a schematic diagram of the process for the preparation of a polyethylene naphthalate fiber in accordance with one embodiment of the present invention.

FIG. 1 represents a schematic diagram of the process for the preparation of a polyethylene naphthalate fiber in accordance with one embodiment of the present invention.

In step (A), polyethylene naphthalate is melt-spun at a spinning draft ratio (the linear velocity on the first withdrawing roller/the linear velocity out of the nozzle) ranging from 400 to 900 at a relatively low temperature ranging from 300 to 318° C. to prevent viscosity decrease caused by heat-decomposition and hydrolysis, through a spinneret equipped with a pack (1) and nozzles (2) to form a molten spun yarn. When the spinning draft ratio is below 400, the spun yarn becomes nonuniform, which results in frequent filament cuts during drawing, while when the ratio is more than 900, excessive filament cuts occurs during spinning.

Figure 2:
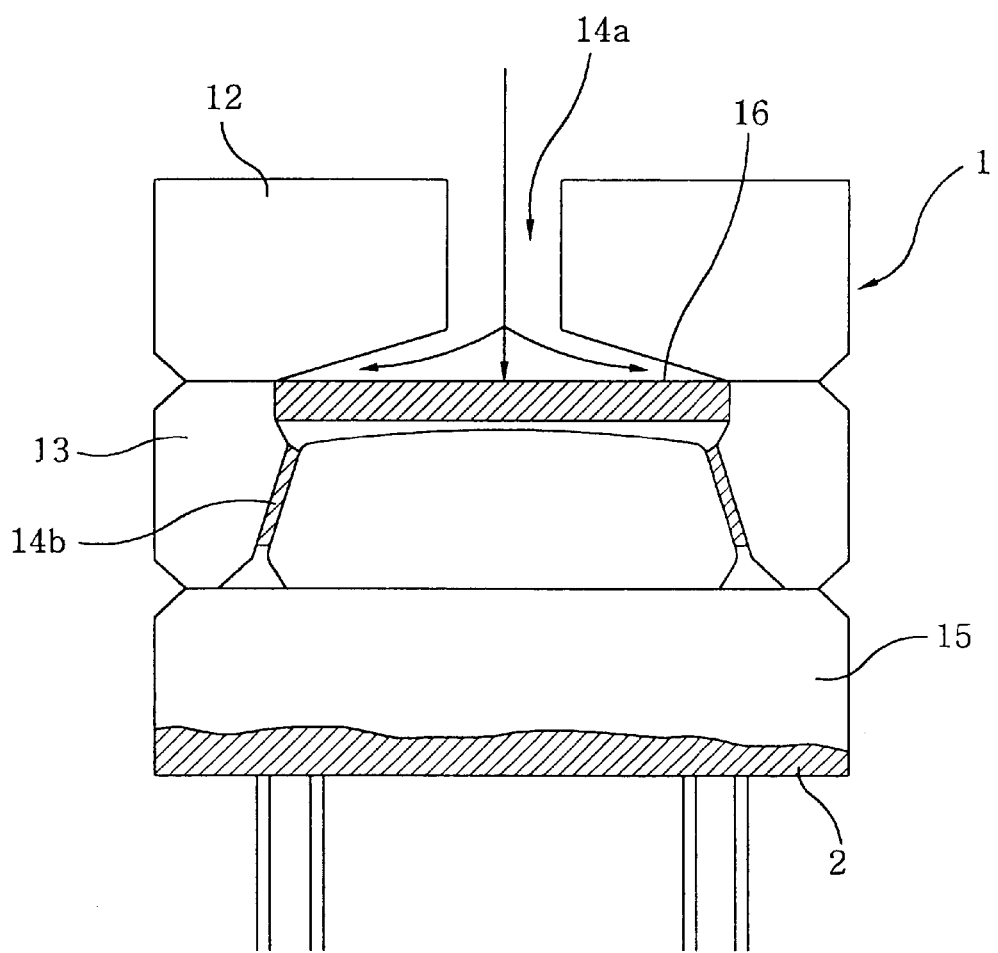
FIG. 2 represents a longitudinal section diagram of the pack used in the process showed in FIG. 1.

FIG. 2 provides a longitudinal section diagram of the pack (2). Preferably, a static mixer having at least three units is placed in the polymer transporting pipe (14a) to uniformly mix the polymer, which is passed through the lower dispersing plate (15) and nozzles (2) to obtain a molten yarn having an uniform viscosity.

In step (B), the spun yarn (4) formed in step (A) traverses a solidification zone comprising a heating zone (having a hood length of L) located just below the nozzles (2) and a cooling zone (3) disposed below the heating zone. The heating zone, L being preferably 300 to 500 mm, is maintained at a temperature of 350 to 400° C. and a cooling air stream is introduced in the cooling zone to quench and solidify the spun yarn having enhanced orientation and uniformity. Further, the solidified spun yarn (4) may be oiled to an amount of 0.5 to 1.0% by passing through an oil-feeding roller (5).

In step (C), the solidified yarn is withdrawn with a withdrawing roller (6) at a rate in the range of 300 to 700 m/min. to form an undrawn yarn having a birefringence of 0.005 to 0.025. When the birefringence of the undrawn yarn is below 0.005, the spun yarn becomes nonuniform, while when the value is more than 0.025, excessive orientation occurs, lowering the tenacity of the yarn.

In step (D), the yarn exiting the withdrawing roller (6) is subjected to a multi-stage-drawing process to a total draw ratio of 6.5 or more with a series of drawing roller (7, 8, 9 and 10), to form a final drawn yarn (11). In this process, the temperature at the second drawing stage is controlled in the range of 150 to 180° C. Specifically, the undrawn yarn is predrawn to an extent of 1 to 10%, and then it is drawn with a first draw ratio of 5 to 7 at a temperature of 130 to 150° C. and a second draw ratio of 1.2 to 2.0 at a temperature of 150 to 180° C. In the first drawing stage, a steam-jet technique may be applied to enhance the uniformity of drawing. At this step, the drawn yarn may be heat-set at a temperature of 220 to 240° C. and relaxed to an extent of 2 to 4%, in accordance with a conventional method.

The polyethylene naphthalate fiber of the present invention, prepared by the above method, has the combined properties of (1) an intrinsic viscosity of 0.70 to 0.77, (2) a tenacity of at least 9.5 g/d, (3) an elongation of at least 9.5%, (4) a birefringence of at least 0.45, (5) a density of 1.355 to 1.368, (6) a melting point of 270 to 275° C., and (7) a shrinkage of 2 to 3%.

The inventive fiber thus prepared may be converted to a treated cord by a conventional process. For example, 2 strands of 1500 denier fiber are plied and cabled with 390 turns/m (the standard twist number for a general polyester treated cord) to prepare a cord yarn; the cord yarn is subjected to a conventional adhesive coating (e.g., isocyanate, epoxy resin, parachlorophenol resin and resorcinol-formaline-latex (RFL)); dried and stretched at a temperature of 130 to 160° C. for a period of 150 to 200 seconds at a stretch ratio of 1.0 to 4.0%; heat-set and stretched at a temperature of 235 to 245° C. for a period of 45 to 80 seconds at a stretch ratio of 2.0 to 6.0%; the cord yarn is again subjected to a conventional adhesive coating (e.g., RFL); dried at a temperature of 140 to 160° C. for a period of 90 to 120 seconds; and then, heat-set at a temperature of 235 to 245° C. for a period of 45 to 80 seconds at a stretch ratio of −4.0 to 2.0%, to obtain a treated cord having a good dimensional stability, represented by the sum of $E_{2.25}$ (elongation at 2.25 g/d load) and FS (free shrinkage) being less than 4.5%, and a tenacity of at least 6.8 g/d.

As described above, the inventive high strength polyethylene naphthalate fiber provides a treated cord having high tenacity and improved dimensional stability that can be advantageously employed as a fibrous reinforcement material of rubber products such as tires and belts.

The following Examples are given for the purpose of illustration only, and are not intended to limit the scope of the invention. In the Examples and Comparative Examples, the characteristics of the yarns and treated cords produced were evaluated in accordance with the following methods.

1. Intrinsic Viscosity (IV)

0.1 g of a sample was dissolved in a mixture of phenol and 1,1,2,3-tetrachloroethane (60/40 by weight) to a concentration of 0.4 g/100 ml. The solution was put in Ubbelohde viscometer and kept in a 30° C. water bath for minutes. The flow time of the solution as well as that of the solvent were measured and RV and IV values were calculated based on the following formulae:

$$RV = \text{flow time of the solution/flow time of the solvent} \quad (1)$$

$$IV = \tfrac{1}{4} \times (RV-1)/C + \tfrac{3}{4} \times (lnRV/C) \quad (2)$$

wherein, C is the sample concentration (g/100 ml).

2. Tenacity

The tenacity of a sample was determined in accordance with ASTM D 885 at a sample length of 250 mm, a tensile speed of 300 mm/min. and 80 turns/m under a standard atmosphere (20° C., 65% relative humidity), using Instron 5565 (Instron Co., Ltd, USA).

3. Density

The density (ρ) of a sample was determined using a xylene/carbon tetrachloride density gradient column at 23° C. The gradient column was prepared and calibrated according to ASTM D 1505 at a density range of 1.34 to 1.41 g/cm$^3$.

4. Shrinkage

A sample was kept under a standard atmosphere (20° C., 65% relative humidity) for 24 hours and then its length ($L_0$) at 0.1 g/d load was measured. Alternatively, a sample was kept in a dry oven of 150° C. under a non-tension condition for 30 minutes and left outdoors for 4 hours, and then its length (L) at 0.1 g/d load was measured. Shrinkage (%) was calculated from the following formula:

$$\Delta S = (L_0 - L)/L_0 \times 100 \quad (3)$$

5. Elongation at Specific Load

As an elongation at specific load, the elongation at 4.5 g/d load was measured on the S—S tenacity curve for an original yarn sample, and the elongation at 2.25 g/d load, for a treated cord sample.

6. Dimensional Stability

The dimensional stability (%) of a treated cord, which is related to the tire sidewall indentations (SWI) and tire handling properties, is determined by the modulus at a given shrinkage, and the sum $E_{2.25}$ (elongaion at 2.25 g/d load)+FS (free shrinkage) is a good indicator of the dimensional stability for a treated cord processed under a particular heat-treatment condition, and the lower the sum, the better the dimensional stability.

7. Birefringence

The birefringence of a sample was determined using a polarizing light microscope equipped with a Berek compensator.

8. Melting Point

A sample was powdered, and 2 mg of the sample powder was put in a pan and sealed. Then, the sample was heated at a rate of 20° C. per 1 minute from room temperature to 290° C. using Perkin-Elmer DSC under a nitrogen atmosphere and the temperature at the maximum heat-absorption peak was set as the melting point.

EXAMPLE 1

A solid-phase polymerization reaction was conducted to obtain a polyethylene naphthalate chip having a manganese content of 40 ppm, an antimony content of 220 ppm, an IV of 0.95, a manganese/phosphorus weight ratio of 1.8, and a moisture content of 20 ppm. The chip was passed through an extender and melt-spun at 316° C. at a rate of 440 g/min. and a spinning draft ratio of 550. Before melt-spinning, the polymer chip was mixed uniformly in a polymer transporting pipe using a static mixer composed of five units. Then, the spun yarns were solidified by passing successively through a 40 cm-long heating zone maintained at 370° C. and located just below the nozzles, and a 530 mm-long cooling zone where a cooling air of 20° C. was blown at a rate of 0.5 m/sec (see FIG. 1). The solidified yarns were oiled and withdrawn at a rate of 380 m/min to form undrawn yarns, which were predrawn to the extent of 5%, and then, drawn in two stages. The first drawing was performed at a draw ratio of 5.6 at 150° C., and the second drawing, at a draw ratio of 1.2 at 170° C. Then, the yarns were heat-set at 230° C., relaxed to 3% and wound to form 1500 denier final drawn yarns (original yarns).

2 strands of the original yarns thus obtained were plied and cabled with 390 turns/m to prepare a cord yarn. The cord yarn was dipped successively in a parachlorophenol resin and then in RFL, dried and stretched at 170° C. for 150 seconds at a stretch ratio of 1.5%, heat-set and stretched at 240° C. for 150 seconds at a stretch ratio of 4.0%, dipped in RFL, dried at a temperature of 240° C. for a period of 100 seconds, and then, heat-set at a temperature of 240° C. for 40 seconds at a stretch ratio of −1.0%, to obtain a treated cord.

The properties of the drawn yarn and the treated cord thus obtained were determined and the results are showed in Table 1.

EXAMPLES 2 to 5 and COMPARATIVE EXAMPLES 1 to 7

The procedures of Example 1 were repeated except for changing the IV of the chip, manganese/phosphorus weight ratio, spinning temperature, spinning draft ratio, length or temperature of the heating zone, or birefringence of the undrawn yarn as represented in Table 1 to obtain various drawn yarns and treated cords.

The properties of drawn yarns and treated cords thus obtained were determined and the results are showed in Table 1.

TABLE 1

| Item | Chip IV | Mn/P weight ratio | Spin. temp. (° C.) | Fine-ness | Spin. draft ratio | Delayed cooling zone Length (cm) | Delayed cooling zone Temp. (° C.) | Birefrin-gence of undrawn yarn | Drawn yarn M.P. (° C.) | IV | Bire-fringence | Den-sity | Tena-city (g/d) | Med. elong. (%) | Elong. (%) | Shrink-age (%) |
|---|---|---|---|---|---|---|---|---|---|---|---|---|---|---|---|---|
| Ex. 1 | 0.95 | 1.8 | 316 | 6.0 | 550 | 40 | 370 | 0.012 | 271 | 0.73 | 0.452 | 1.360 | 9.7 | 4.0 | 9.5 | 2.2 |
| Ex. 2 | 0.95 | 1.7 | 315 | 6.0 | 550 | 30 | 370 | 0.012 | 270 | 0.72 | 0.453 | 1.357 | 9.6 | 3.8 | 9.5 | 2.5 |
| Ex. 3 | 0.95 | 1.7 | 315 | 6.0 | 550 | 30 | 390 | 0.010 | 270 | 0.72 | 0.454 | 1.360 | 9.7 | 3.7 | 9.5 | 2.5 |
| Ex. 4 | 0.95 | 1.7 | 315 | 6.0 | 647 | 45 | 390 | 0.008 | 272 | 0.72 | 0.454 | 1.363 | 10.0 | 3.9 | 9.5 | 2.5 |
| Ex. 5 | 0.95 | 1.7 | 315 | 3.9 | 647 | 45 | 390 | 0.009 | 271 | 0.72 | 0.452 | 1.362 | 10.1 | 3.9 | 9.5 | 2.5 |
| Comp. Ex. 1 | 0.88 | 1.7 | 315 | 6.0 | 647 | 45 | 370 | 0.012 | 270 | 0.69 | 0.444 | 1.357 | 9.3 | 3.9 | 9.1 | 2.4 |
| Comp. Ex. 2 | 1.02 | 1.7 | 320 | 6.0 | 647 | 45 | 370 | 0.015 | 272 | 0.76 | 0.455 | 1.365 | 9.2 | 4.2 | 8.8 | 2.5 |
| Comp. Ex. 3 | 0.95 | 1.7 | 315 | 6.0 | 353 | 45 | 370 | 0.008 | 272 | 0.72 | 0.452 | 1.357 | 9.4 | 4.0 | 9.5 | 2.5 |
| Comp. Ex. 4 | 0.95 | 1.7 | 315 | 6.0 | 1010 | 45 | 370 | 0.017 | 274 | 0.72 | 0.451 | 1.366 | 9.3 | 3.8 | 9.2 | 2.7 |
| Comp. Ex. 5 | 0.95 | 1.7 | 315 | 6.0 | 1010 | 20 | 370 | 0.016 | 271 | 0.72 | 0.452 | 1.358 | 9.2 | 3.9 | 8.7 | 2.7 |
| Comp. Ex. 6 | 0.95 | 1.7 | 315 | 6.0 | 647 | 60 | 390 | 0.005 | 270 | 0.72 | 0.450 | 1.360 | 9.3 | 3.9 | 9.5 | 2.5 |
| Comp. Ex. 7 | 0.95 | 2.1 | 315 | 6.0 | 647 | 45 | 390 | 0.008 | 268 | 0.70 | 0.446 | 1.360 | 9.2 | 3.9 | 9.3 | 2.4 |

| Item | Treated cord Tenacity (g/d) | Med elong. (%) | Shrinkage (%) | $E_{225}$ + FS (%) | Remark |
|---|---|---|---|---|---|
| Ex. 1 | 7.1 | 2.3 | 2.0 | 4.3 | |
| Ex. 2 | 6.8 | 2.2 | 2.2 | 4.4 | |
| Ex. 3 | 6.9 | 2.2 | 2.3 | 4.5 | |

TABLE 1-continued

|       | | | | | |
|-------|-----|-----|-----|-----|----|
| Ex. 4 | 7.1 | 2.2 | 2.2 | 4.4 |    |
| Ex. 5 | 7.1 | 2.2 | 2.1 | 4.3 |    |
| Comp. Ex. 1 | 6.6 | 2.2 | 2.2 | 4.4 |    |
| Comp. Ex. 2 |     |     |     |     | XX |
| Comp. Ex. 3 | 6.7 | 2.2 | 2.1 | 4.3 |    |
| Comp. Ex. 4 | 6.6 | 2.2 | 2.3 | 4.5 |    |
| Comp. Ex. 5 | 6.6 | 2.2 | 2.2 | 4.4 |    |
| Comp. Ex. 6 | 6.6 | 2.2 | 2.2 | 4.4 |    |
| Comp. Ex. 7 | 6.6 | 2.2 | 2.2 | 4.4 | X  |

X: Poor appearance
XX: Very poor appearance and it was impossible to prepare treated cord As described above, the high strength polyethylene naphthalate fiber of the present invention can be converted into a treated cord having high tenacity and improved dimensional stability that can be advantageously employed as a fibrous reinforcement material of rubber products such as tires and belts.

While the embodiments of the subject invention have been described and illustrated, it is obvious that various changes and modifications can be made therein without departing from the spirit of the present invention which should be limited only by the scope of the appended claims.

What is claimed is:

1. A polyethylene naphthalate fiber prepared by a method comprising the steps of:
    (A) melt-spinning a solid-phase polymerized polyethylene-2,6-naphthalate chip, composed of 95 mol % or more of ethylene-2,6-naphthalate units as the recurring unit, and having a manganese content of 30 to 70 ppm, an antimony content of 180 to 300 ppm and an intrinsic viscosity of 0.90 to 1.00, through a spinneret to a spinning draft ratio ranging from 400 to 900 to form a molten spun yarn,
    (B) rapid-cooling and solidifying the spun yarn by passing it through a solidification zone,
    (C) withdrawing the solidified yarn at such a rate that an undrawn yarn having a birefringence of 0.005 to 0.025 is formed, and
    (D) subjecting the undrawn yarn to a multi-stage-drawing process to a total draw ratio of 6.5 or more to obtain a fiber, wherein the temperature of the second drawing stage is maintained in the range of 150 to 180° C.; said fiber having (1) an intrinsic viscosity of 0.70 to 0.77, (2) a tenacity of at least 9.5 g/d, (3) an elongation of at least 9.5%, (4) a birefringence of at least 0.45, (5) a density of 1.355 to 1.368, (6) a melting point of 270 to 275° C., and (7) a shrinkage of 2 to 3%.

2. The polyethylene naphthalate fiber of claim 1, wherein the chip further comprises a phosphorus component in such an amount that the manganese/phosphorus weight ratio is 2.0 or below.

3. The polyethylene naphthalate fiber of claim 1, wherein the solidification zone in step (B) comprises a heating zone having a length of 300 to 500 mm and maintained at a temperature of 350 to 400° C., and a cooling zone disposed just below the heating zone.

4. A treated cord prepared by plying and cabling 2 strands of the polyethylene naphthalate fiber of claim 1, followed by a resorcinol-formaline-latex treatment; said cord having (1) a dimensional stability index represented by the sum of $E_{2.25}$ (elongation at 2.25 g/d load) and FS (free shrinkage) of 4.5% or below, and (2) a tenacity of at least 6.8 g/d.

5. A rubber product comprising the treated cord of claim 4.

* * * * *